US011919482B2

(12) United States Patent
Sawatzki et al.

(10) Patent No.: US 11,919,482 B2
(45) Date of Patent: Mar. 5, 2024

(54) MOTOR VEHICLE HAVING AT LEAST ONE DOOR STEP

(71) Applicant: Ford Global Technologies, LLC, Dearborn, MI (US)

(72) Inventors: Marius Sawatzki, Pulheim (DE); Daniel Meckenstock, Wuppertal (DE); Stefan Schneider, Rösrath (DE); Dominik Mueller, Euskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 17/522,313

(22) Filed: Nov. 9, 2021

(65) Prior Publication Data
US 2022/0144175 A1 May 12, 2022

(30) Foreign Application Priority Data

Nov. 11, 2020 (DE) .......................... 102020214184.3

(51) Int. Cl.
*B60R 3/02* (2006.01)
*B60L 50/60* (2019.01)
(52) U.S. Cl.
CPC ................ *B60R 3/02* (2013.01); *B60L 50/66* (2019.02)
(58) Field of Classification Search
CPC .. B60R 3/00; B60R 3/02; B60R 3/002; B62D 21/15; B62D 21/157
See application file for complete search history.

(56) References Cited

U.S. PATENT DOCUMENTS

| 6,905,136 | B2 * | 6/2005 | Vidal | F16F 7/125 280/752 |
| 8,708,402 | B2 * | 4/2014 | Saeki | B62D 21/157 180/68.5 |
| 9,034,502 | B2 * | 5/2015 | Kano | B62D 21/157 429/99 |
| 9,061,712 | B2 * | 6/2015 | Patberg | B62D 21/157 |
| 2003/0006575 | A1 * | 1/2003 | Genis | B60R 19/42 280/163 |
| 2009/0058136 | A1 * | 3/2009 | Shoap | B62D 21/152 296/187.11 |
| 2020/0148121 | A1 * | 5/2020 | Aitharaju | B32B 5/18 |
| 2020/0227705 | A1 * | 7/2020 | Grace | B60L 3/0007 |
| 2021/0122423 | A1 * | 4/2021 | Ravantab | B60K 1/04 |
| 2022/0169180 | A1 * | 6/2022 | Fisher | B60R 3/02 |

FOREIGN PATENT DOCUMENTS

| DE | 202014102281 | 7/2014 |
| DE | 202016106389 | 3/2017 |

* cited by examiner

*Primary Examiner* — Brian L Swenson
(74) *Attorney, Agent, or Firm* — Burris Law, PLLC

(57) ABSTRACT

A vehicle includes a battery housing, a plurality of batteries, and a door step. The battery housing is disposed in a floor area of the vehicle. The batteries are within the battery housing. The door step is located proximate a side of the battery housing. The door step includes an upper running board with a stepping surface and a lower bottom part that is spaced apart from the upper running board and extends parallel to the upper running board to define at least one chamber therebetween. The lower bottom part includes a central weakened area which extends in a longitudinal direction of the vehicle and is configured to permit a center region of the door step to buckle upwards in response to a lateral force greater than a predetermined threshold amount of force.

20 Claims, 3 Drawing Sheets

MOTOR VEHICLE HAVING AT LEAST ONE DOOR STEP

CROSS-REFERENCE TO RELATED APPLICATIONS

This application claims priority to and the benefit of German Patent Application No. 102020214184.3, filed on Nov. 11, 2020. The disclosure of the above application is incorporated herein by reference.

FIELD

The present disclosure relates to a motor vehicle, and more specifically to a hybrid or electric vehicle having batteries arranged in the floor area and at least one door step located at the side of the battery housing.

BACKGROUND

The statements in this section merely provide background information related to the present disclosure and may not constitute prior art.

A door step is typically found on large vehicles with high ground clearance, such as busses, trucks, or off-road vehicles. The door step serves to make it easier for passengers to enter and exit the passenger compartment of the vehicle.

In hybrid or electric vehicles, the batteries are typically located in a battery housing, which is arranged in the floor area of the vehicle.

In some vehicles and under some circumstances, such as certain side impact events, it may be possible for the door step to be pushed toward the interior of the vehicle in a manner that may damage the battery housing and the batteries arranged therein.

A motor vehicle with door steps on both sides is already known from DE 20 2016 106 389 U1 ("DE '389"), in which the door steps provide a protective function in the event of a side impact. In DE '389, the supporting elements of the door step are connected to the sill in the manner of a parallelogram. In the event of a side impact, the parallelogram reacts in such a way that it buckles and is displaced primarily in the longitudinal direction. Although good side impact protection is provided as a result of this structure, the vehicle of DE '389 does not have any features which serve to protect batteries arranged in the floor area of the vehicle.

DE 20 2014 102 281 U1 ("DE '281") discloses an underbody structure for a motor vehicle which has a relatively high number of batteries in its floor area. To protect the batteries in the event of a side impact, which results in the respective longitudinal sidemember being pressed inwards, the impact forces which occur are deflected forwards and rearwards via obliquely arranged supporting elements so that the force of the impact, which acts on the respective sidemember, is not transferred directly to the batteries arranged in the central floor area. However, the vehicle described in DE '281 does not have any side door steps. Thus, DE '281 is silent regarding the behavior of door steps in the event of a side impact.

The disclosures of DE '389 and DE '281 are incorporated herein by reference in their entireties.

SUMMARY

This section provides a general summary of the disclosure and is not a comprehensive disclosure of its full scope or all of its features.

The teachings of the present disclosure provide measures in a hybrid or electric vehicle equipped with at least one door step so that batteries arranged in the floor area of the vehicle are not damaged by the door step in the event of a side impact.

According to one form of the present disclosure, the door step is designed to be substantially hollow and has an upper running board with a stepping surface and a lower bottom part extending parallel to the running board. In one form, the lower bottom part may optionally be planar. The lower bottom part is equipped with a central weakened area, which extends in the longitudinal direction (e.g., in the x direction) of the vehicle and allows the center of the door step to buckle upwards (e.g., in the z direction) in the event of a side impact.

As a result of this structure, the inwardly pressed door step is very effectively inhibited from damaging the batteries in the event of a side impact since the door step buckles upwards in its central area in the event of a side impact instead of toward the batteries arranged behind the door step. The impact forces occurring in the case of a side impact are consequently diverted partially upwards (e.g., in the z direction) as a result of the buckling of the door step so that the impact force acting in the direction of the batteries is largely eliminated or reduced.

In another form, the central weakened area of the lower bottom part extends linearly in the longitudinal direction (e.g., x direction) of the vehicle. As a result of the different rigidities between the upper running board and the lower bottom part, the upwardly directed buckling is automatically triggered over the entire length of the step so that the step is inhibited from entering the battery area.

In one form, the central weakened area of the lower bottom part can be formed by a row of successively arranged holes. In one particular form, the holes may be circular or oval. In another form, the holes can be rectangular or have any other shape.

In yet another form, the central weakened area of the lower bottom part has a smaller wall thickness than the adjoining material so that the buckling of the door step can also take place as a result of such a structure.

In one form, the door step is substantially hollow and includes reinforcing webs extending in the longitudinal direction of the vehicle between the upper running board and the bottom part to increase stability. The reinforcing webs can divide the interior of the door step into intermediate step chambers.

In one form, the central weakened area of the lower bottom part can be located in the region of an intermediate step chamber, where the reduction in the rigidity can be realized.

In another form, a compression zone, which is formed from a deformable crumple part, can be provided between the door step and the battery housing to provide additional protection for the battery housing and the batteries accommodated therein.

In one form, the crumple part serves as a compression zone and consists of a profile part equipped with a plurality of chambers, which can be an aluminum extruded profile, for example.

In one form, the crumple part has, on its side facing the door step, a stop plate equipped with a sliding surface.

In another form, the sliding surface of the stop plate can lead to the underside of the crumple part so that the door step can slide under the battery housing in the event of a side impact to avoid contact with the batteries.

In one form, the door step is equipped with a step swivel mechanism with which the door step can be swiveled under the vehicle during travel. In this form, the door step not only buckles upwards in the event of a side impact, but can slide under the battery housing along the sliding surface of the stop plate together with the step swivel mechanism. In one such form, the vehicle may optionally be a bus.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
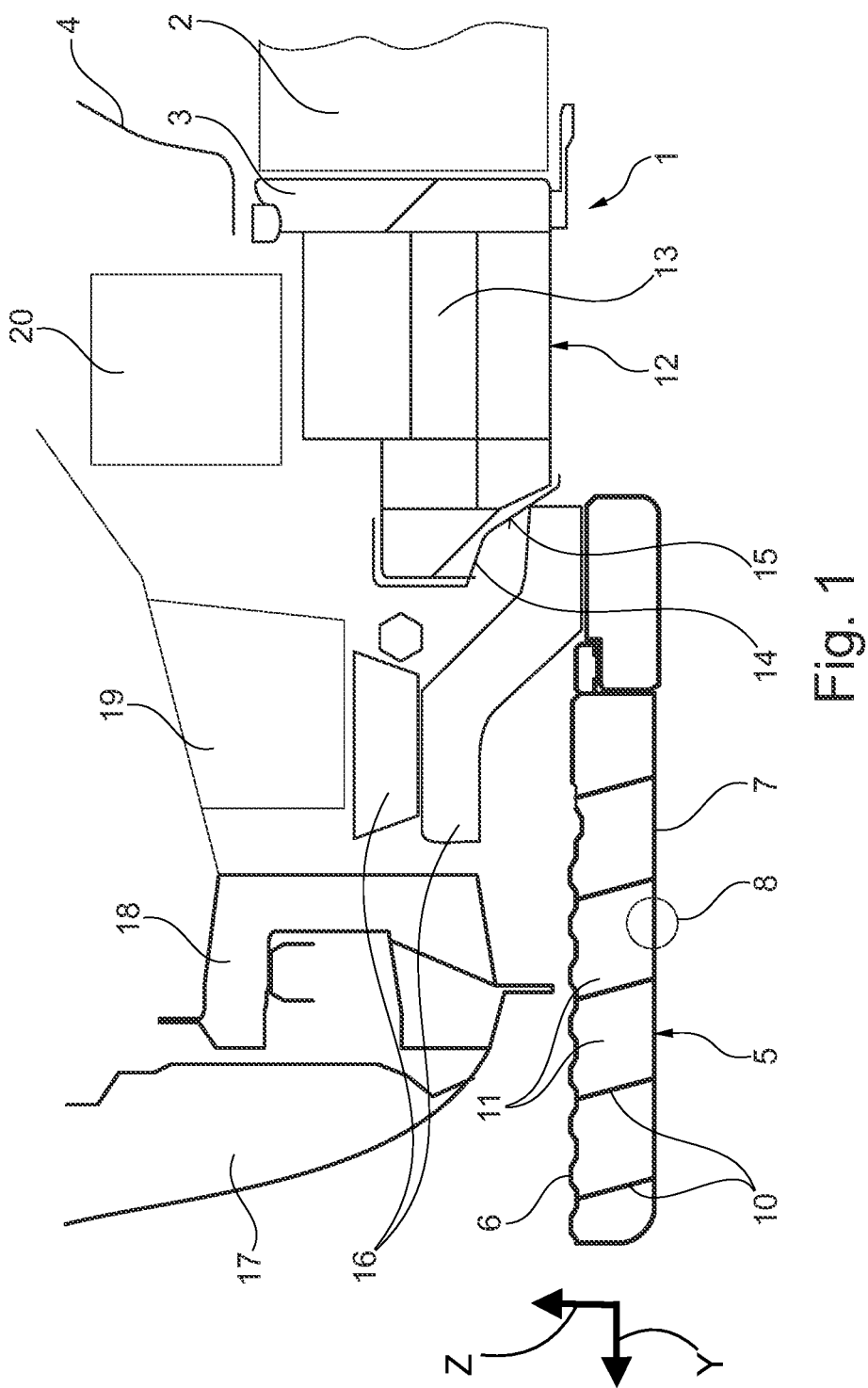
FIG. 1 is a schematic partial cross-sectional view of a portion of a motor vehicle with a swivelable door step in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The schematically illustrated cross-section through a portion of a motor vehicle in FIG. 1 substantially shows the floor area 1 of a hybrid or electric vehicle. Batteries 2 arranged in the central floor area 1 of the motor vehicle are located on the right in FIG. 1 (i.e., inboard side of FIG. 1). The batteries 2 are arranged in a battery housing 3. The battery housing 3 is closed at the top by a housing cover 4.

The motor vehicle is furthermore equipped with a door step 5, as is conventional in the case of busses, for example, to make it easier for the passengers to enter and exit. The door step 5 can be swiveled under the vehicle during travel.

The swiveled position of the door step 5 is illustrated in FIG. 1 of the drawing. The swiveling take place with the aid of a step swivel mechanism 16, which is coupled to the door step 5.

In the swiveled state, the door step 5 is located underneath the vehicle door 17 and underneath the door sill 18. In the example provided, the vehicle door 17 is a sliding door, though other configurations can be used. In this position, the step swivel mechanism 16 lies inwardly offset behind the door sill 18 and underneath the vehicle sidemember 19. A battery holder sidemember 20 is furthermore arranged adjacent to the vehicle sidemember 19 on the right.

The door step 5 is substantially hollow and has an upper running board 6 with a stepping surface and a lower bottom part 7 extending parallel to the running board 6. The lower bottom part 7 may optionally be planar or substantially planar. The lower bottom part 7 is equipped with a central weakened area 8 extending in the longitudinal direction (in the x direction) of the vehicle. The central weakened area 8 of the bottom part 7 extends linearly over the entire width of the door step 5 in the longitudinal direction (i.e., x direction, shown in FIG. 2) of the vehicle.

Figure 2:
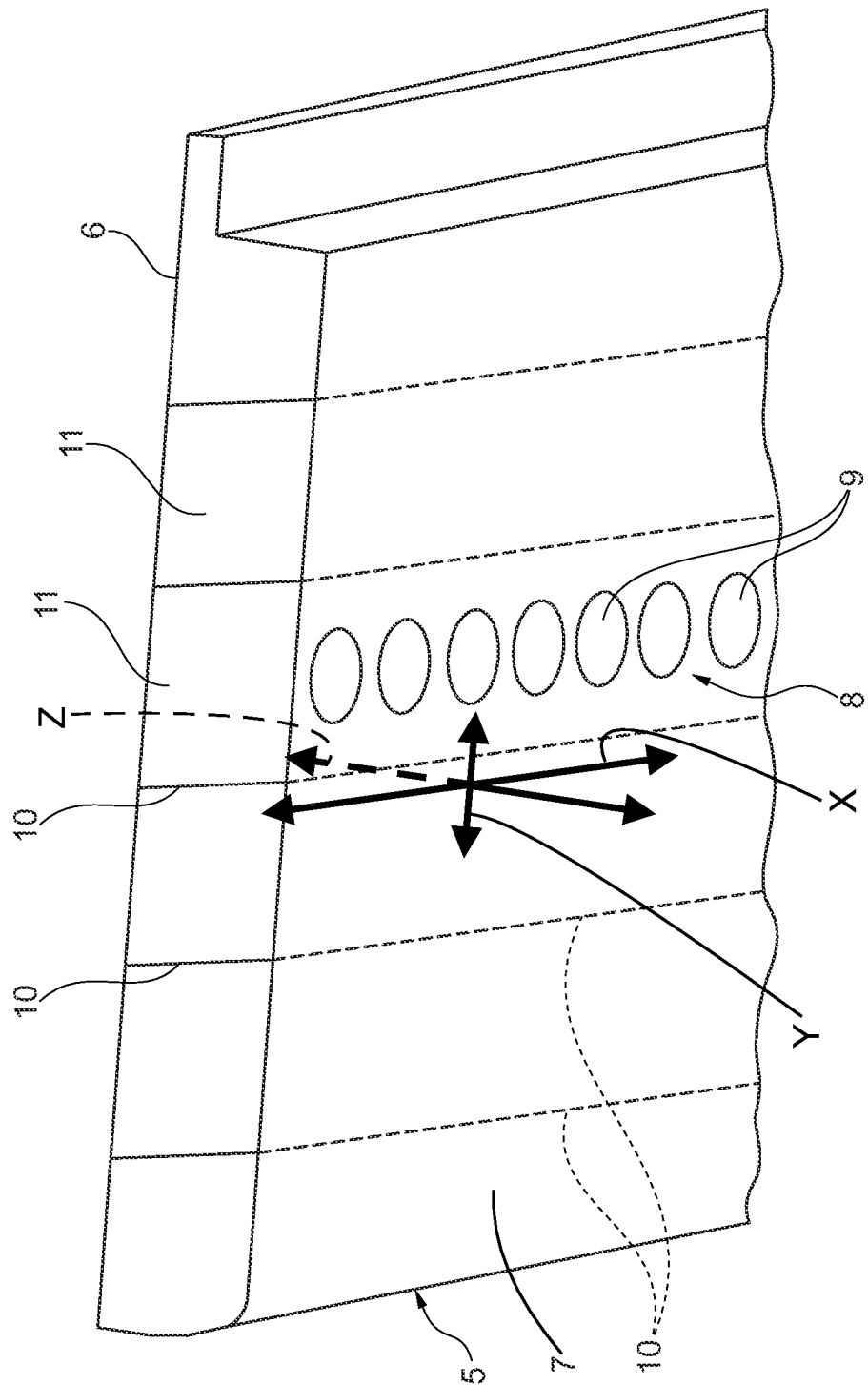
FIG. 2 is a perspective sectional view through the door step of FIG. 1, illustrated as viewed from below.

With additional reference to FIG. 2, the central weakened area 8 of the lower bottom part 7 can be formed by a row of successively arranged holes 9. In the example provided, the holes 9 are circular or oval. However, the holes 9 can alternatively have any other shape (e.g., rectangular) which results in the central weakened area 8 of the bottom part 7 being weakened at this location. In another form, not specifically shown, the central weakened area 8 of the lower bottom part 7 can additionally or alternatively have a smaller wall thickness in order to ensure the upward buckling of the door step 5 in the event of a side impact (e.g., a lateral force greater than a predetermined threshold amount of force).

The door step 5 has sufficient rigidity and stability to support heavy loads in the negative z direction, such as people stepping on the door step 5. To this end, reinforcing webs 10 extending in the longitudinal direction (i.e., x direction) of the vehicle are provided between the upper running board 6 and the planar lower bottom part 7. The reinforcing webs divide the interior of the door step 5 into intermediate step chambers 11. In this case, the central weakened area 8 of the lower bottom part 7 is arranged in such a way that it lies in a portion of one of the intermediate step chambers 11.

The door step 5 is configured to inhibit contact between the door step 5 and the battery housing 3 with the batteries 2 located therein in the event of a side impact. This applies particularly in the operating state shown in FIG. 1, in which the door step 5 is swiveled under the floor area 1 of the vehicle.

Figure 3:
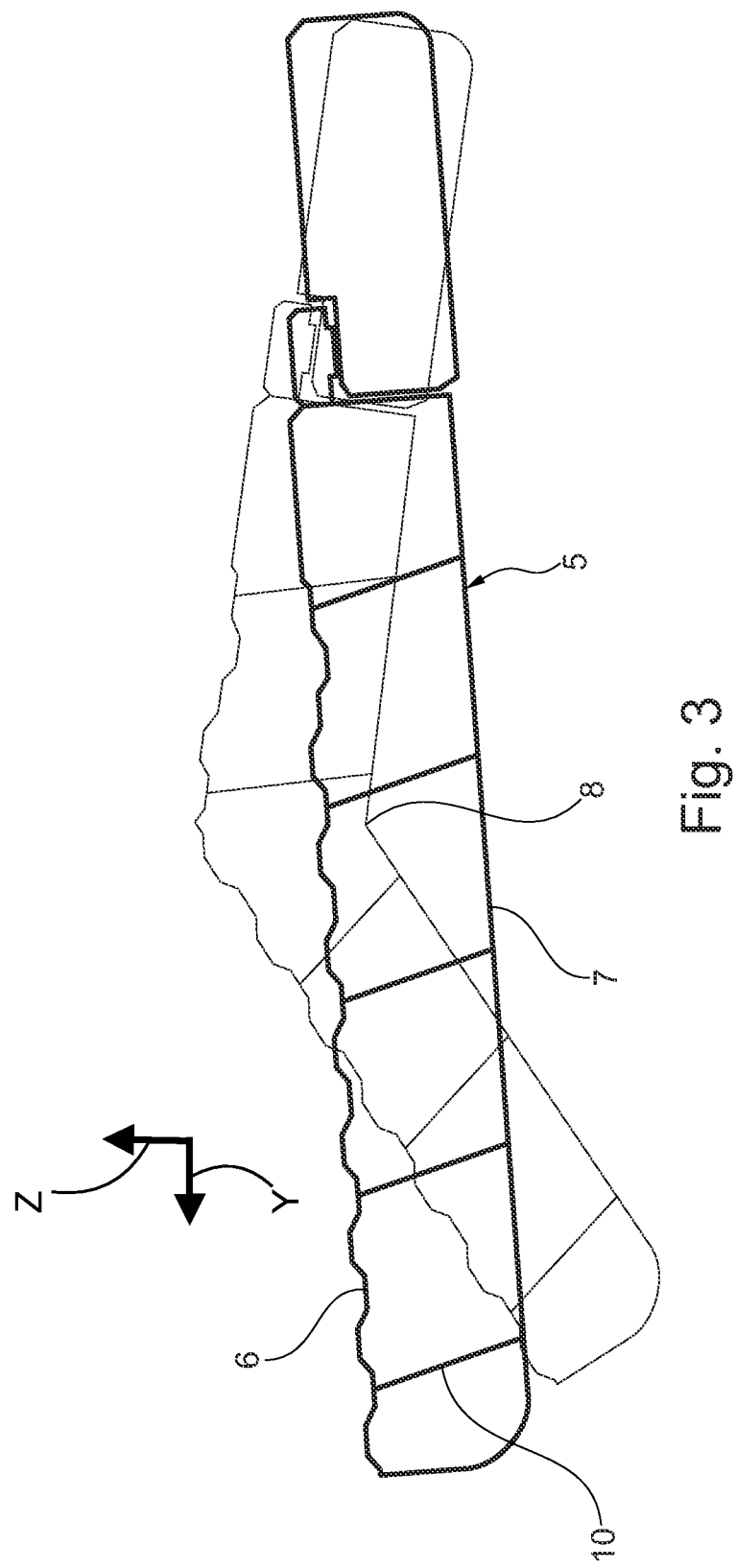
FIG. 3 is a cross-sectional view of the door step of FIGS. 1 and 2, illustrated in an unbuckled state and in a compressed state, in which the door step has buckled upwards in the center after a side impact, in accordance with the teachings of the present disclosure.

With continued reference to FIGS. 1 and 2 and additional reference to FIG. 3, the door step 5 protects the battery housing 3 and batteries 2 by the door step 5 buckling upwards (shown in thin lines in FIG. 3) in the event of a side impact. Thus, the impact forces occurring in the case of the side impact are deflected upwards in the z direction instead of laterally or inboard (i.e., negative y direction) toward the battery housing 3 and batteries 2. The upwardly directed buckling is brought about by the central weakened area 8 of the lower bottom part 7 being compressed, whereby the door step 5 is automatically folded in the center and the central area is pressed upwards (i.e., z direction). Thus, the door step 5 is inhibited from being moved in its entirety in the direction toward the battery housing 3.

Additionally, a compression zone is provided between the door step 5 and the battery housing 3. The compression zone provides additional protection of the battery housing 3 in the case of a heavy or high force side impact. This compression zone is formed by an easily deformable crumple part 12, which is arranged on the side of the battery housing 3 which faces towards the door step 5 (i.e., the side facing outboard or in the y direction). The crumple part 12 can consist of a profile part 13 which is equipped with a plurality of chambers and may be configured, for example, as an aluminum extruded profile.

The crumple part 12 has, on its side facing the door step 5, a stop plate 15 which is equipped with a sliding surface 14. The sliding surface 14 of the stop plate 15 extends in the form of a slope to the underside of the crumple part 12 so that the door step not only buckles upwards in the event of a heavy side impact but additionally slides along the sliding surface 14 until under the battery housing 3 together with the step swivel mechanism 16 so that the battery housing 3 remains intact and the batteries 2 are protected from the lateral force.

While described herein as being particularly suitable for hybrid and electric vehicles in which the door step 5 is swiveled under the floor area of the vehicle during travel, the door step 5 and teachings of the present disclosure can also be used in all other vehicles in which a door step is present, including vehicles in which the door step cannot be swiveled under the vehicle floor. As a result of the buckling of the door step 5, a large proportion of the lateral force from a side impact is dissipated or deflected in that the door step 5 is not displaced inwards but buckles centrally upwards. Thus, the batteries 2 in a hybrid or electric vehicle are largely protected.

Finally, the door step 5 and teachings of the present disclosure can be used in all vehicles which are equipped with door steps in any case, including trucks or off-road vehicles, even those without batteries adjacent to the door step 5. In other words, the door step 5 and teachings of the present disclosure serves as additional protection to the vehicle in the case of a side impact, regardless of whether batteries are located inboard of the door step 5.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
a battery housing disposed in a floor area of the vehicle;
a plurality of batteries disposed within the battery housing;
a door sill;
a vehicle side member laterally between the door sill and the battery housing;
a door step located proximate a side of the battery housing, the door step including an upper running board with a stepping surface and a lower bottom part that is spaced apart from the upper running board and extends parallel to the upper running board to define at least one chamber therebetween, the lower bottom part includes a central weakened area which extends in a longitudinal direction of the vehicle and is configured to permit a center region of the door step to buckle upwards in response to a lateral force greater than a predetermined threshold amount of force; and
a deformable crumple part located laterally outboard of the battery housing;
wherein the door step is coupled to the vehicle side member at a location that is laterally between the door sill and the deformable crumple part.

2. The vehicle according to claim 1, wherein the central weakened area of the lower bottom part extends linearly over an entire width of the door step in the longitudinal direction of the vehicle.

3. The vehicle according to claim 2, wherein the central weakened area of the lower bottom part is formed by a row of successively arranged holes.

4. The vehicle according to claim 3, wherein the holes are circular or oval.

5. The vehicle according to claim 3, wherein the holes are rectangular.

6. The vehicle according to claim 2, wherein the central weakened area of the lower bottom part has a smaller wall thickness than a remainder of the lower bottom part.

7. The vehicle according to claim 1, wherein the central weakened area of the lower bottom part is formed by a row of successively arranged holes.

8. The vehicle according to claim 1, wherein a plurality of reinforcing webs extend in the longitudinal direction of the vehicle between the upper running board and the lower bottom part of the door step, the reinforcing webs dividing the at least one chamber of the door step into a plurality of intermediate step chambers.

9. The vehicle according to claim 8, wherein the central weakened area of the lower bottom part is located between an adjacent pair of the reinforcing webs.

10. The vehicle according to claim 1, wherein the deformable crumple part is formed from a profile part defining a plurality of chambers.

11. The vehicle according to claim 10, wherein the profile part is an aluminum extruded profile.

12. The vehicle according to claim 1, wherein the deformable crumple part includes, on a side facing the door step, a stop plate defining a sliding surface.

13. The vehicle according to claim 12, wherein the sliding surface of the stop plate extends at a slope to an underside of the deformable crumple part such that the sliding surface is configured to redirect lateral inboard movement of the door step to be at least partially downward movement to a location under the battery housing.

14. The vehicle according to claim 13 further comprising a step swivel mechanism configured to swivel the door step between an extended position and a retracted position in which the door step is positioned farther under a door of the vehicle than when in the extended position, wherein the step swivel mechanism is configured to slide along the sliding surface with the door step under the battery housing.

15. The vehicle according to claim 1 further comprising a step deployment mechanism that couples the door step to the vehicle side member, the step deployment mechanism being configured to move the door step between an extended position and a retracted position in which the door step is positioned farther under the door sill than when in the extended position, wherein the step deployment mechanism is entirely outboard of the deformable crumple part when in the extended position and at least partially outboard of the deformable crumple part when in the retracted position.

16. A vehicle comprising:
a battery housing disposed in a floor area of the vehicle;
a plurality of batteries disposed within the battery housing;
a door step located proximate a side of the battery housing, the door step including an upper running board with a stepping surface and a lower bottom part that is spaced apart from the upper running board and extends parallel to the upper running board to define at least one chamber therebetween, the lower bottom part includes a central weakened area which extends in a longitudinal direction of the vehicle and is configured to permit a center region of the door step to buckle upwards in response to a lateral force greater than a predetermined threshold amount of force; and a deformable crumple part laterally between the door step and the battery housing, wherein the deformable crumple part includes, on a side facing the door step, a stop plate defining a sliding surface.

17. A vehicle comprising:

a battery housing disposed in a floor area of the vehicle;

a plurality of batteries disposed within the battery housing; and a door step located proximate a side of the battery housing, the door step including an upper running board with a stepping surface and a lower bottom part that is spaced apart from the upper running board and extends parallel to the upper running board to define at least one chamber therebetween, the lower bottom part includes a central weakened area which extends in a longitudinal direction of the vehicle and is configured to permit a center region of the door step to buckle upwards in response to a lateral force greater than a predetermined threshold amount of force, wherein the central weakened area of the lower bottom part is formed by a row of successively arranged holes.

18. The vehicle according to claim 17, wherein the holes are circular or oval.

19. The vehicle according to claim 17, wherein the holes are rectangular.

20. The vehicle according to claim 17, wherein a plurality of reinforcing webs extend in the longitudinal direction of the vehicle between the upper running board and the lower bottom part of the door step, the reinforcing webs dividing the at least one chamber of the door step into a plurality of intermediate step chambers, wherein the central weakened area of the lower bottom part is located between an adjacent pair of the reinforcing webs.

* * * * *